: 2,976,084
Patented Mar. 21, 1961

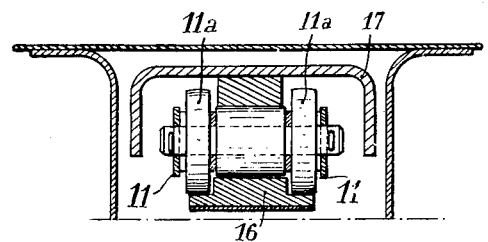
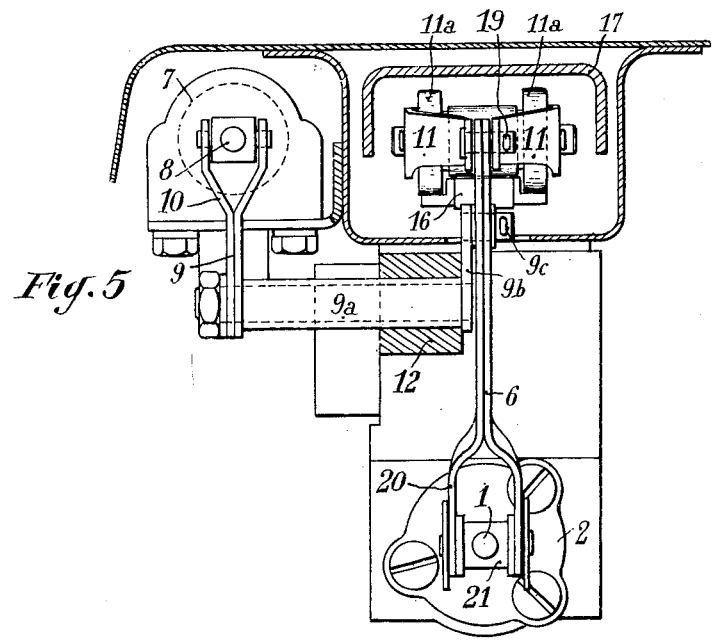

2,976,084

BRAKE CONTROL DEVICE FOR AUTOMOTIVE VEHICLES

Antoine Brueder, Paris, France, assignor to Societe Anonyme Andre Citroen, Paris, France Filed May 15, 1958, Ser. No. 735,445

Claims priority, application France Feb. 10, 1958

4 Claims. (Cl. 303—6)

This invention relates to devices for controlling the brakes of automotive vehicles.

In prior patent applications filed by the applicant, notably the French Patent No. 1,014,251 of March 10, 1950, the French Certificate of Addition No. 61,958 of April 19, 1951 and the U.S. Patent No. 2,929,660 of November 16, 1959, there is described a method whereby the braking effort applied to the brake mechanism associated with the axles of a vehicle can be distributed in proportion to the load supported by each axle. In most cases one of the axles is characterized by moderate load variations and a simplified system may be provided whereby the other axle alone controls the proportional distribution of the braking force. This specific case is contemplated in the U.S. Patent No. 2,929,660. This method constitutes a sufficient approach to the optimum solution of the problem as far as moderate decelerations are dealt with, for example when driving on a highly skidding road where any harsh brake application must be avoided. On the other hand, when it is desired to utilize the maximum braking power and obtain the maximum deceleration, the law governing the aforesaid distribution of forces is altered since the axle of which the load was considered as invariable under normal driving conditions will actually receive, each time a substantial deceleration takes place, the whole of the weight discharged from the correcting axle as a consequence of this deceleration.

Thus, the correction is effected with a certain time lag with respect to the actual load variation.

It is the object of the present invention to avoid this drawback while preserving the original constructional and operative simplicity of the control device.

The aforesaid U.S. Patent No. 2,929,660 describes a correcting device wherein the load carried by the suspension system or member of the axle chosen as a reference axle controls the displacement of the point of engagement of a yoke bar controlling in turn simultaneously and independently the braking system of the two axles of the vehicle. The device is so arranged that the two arms of the yoke bar are equal when equal loads are supported by the two axles, and inversely proportional to the loads of these axles when the axle taken as a reference axle is fully loaded. According to this invention, this device is completed by a mechanism adapted to displace the point of engagement of the yoke bar by an additional length upon each brake application, the arrangement being such that the greater the braking effort the greater the aforesaid additional length.

By effecting a convenient initial adjustment of the device an adequate distribution or proportioning of the braking efforts can be obtained even in the occurrence of very strong accelerations, whereas the arrangement of the aforesaid patent application affords only a very approximate compromise.

It is the essential object of this invention to provide a brake control device adapted to distribute the braking effort amongst the two axles in proportion to the instantaneous loads supported by said axles, respectively, as a consequence of the load distribution on the vehicle and of the dynamic stresses to which the vehicle is subjected during brake applications.

This invention is applicable to a hydraulic braking system wherein the brake pedal acting on a roller slidably movable—under the control of the pressure developing in the hydraulic suspension system of one of the axles taken as a reference axle for the load carried by the axles—on a yoke bar connected to a pair of slide valves of a distributor is adapted to supply the brake cylinders of the two axles with compressed fluid at pressures equal to those exerted on said slide valves respectively.

This invention is characterized in that the displacement of the pedal-actuated roller is subordinate to the position of one end of a lever having its fulcrum displaced in a manner responsive to the pressure developing in the reference axle, the other end of said lever being displaced in a manner responsive to the pressure of the fluid delivered by the distributor to the brake cylinders of the other axle taken as reference axle of the braking force.

As a matter of fact, it is admitted that the deceleration is substantially a function of the braking effort and consequently of the pressure developing in the pipe lines of the braking system.

Preferably, the axle to be selected as a reference axle for the load supported by the axles is the one supporting the heaviest load when the vehicle is fully loaded, and the axle to be selected as a reference axle for the braking force is the one supporting the least load under the same conditions. In most instances these axles are the rear axle and the front axle respectively.

In order to afford a clearer understanding of this invention and of the manner in which the same may be carried out in the practice, reference will now be made to the accompanying drawings forming part of this invention and illustrating diagrammatically by way of example a typical embodiment of the invention. In the drawings:

Figure 4 is a fragmentary section taken upon the line IV—IV of Fig. 3; and

Figure 5 is a fragmentary section taken upon the line V—V of Fig. 3.

Figure 1:
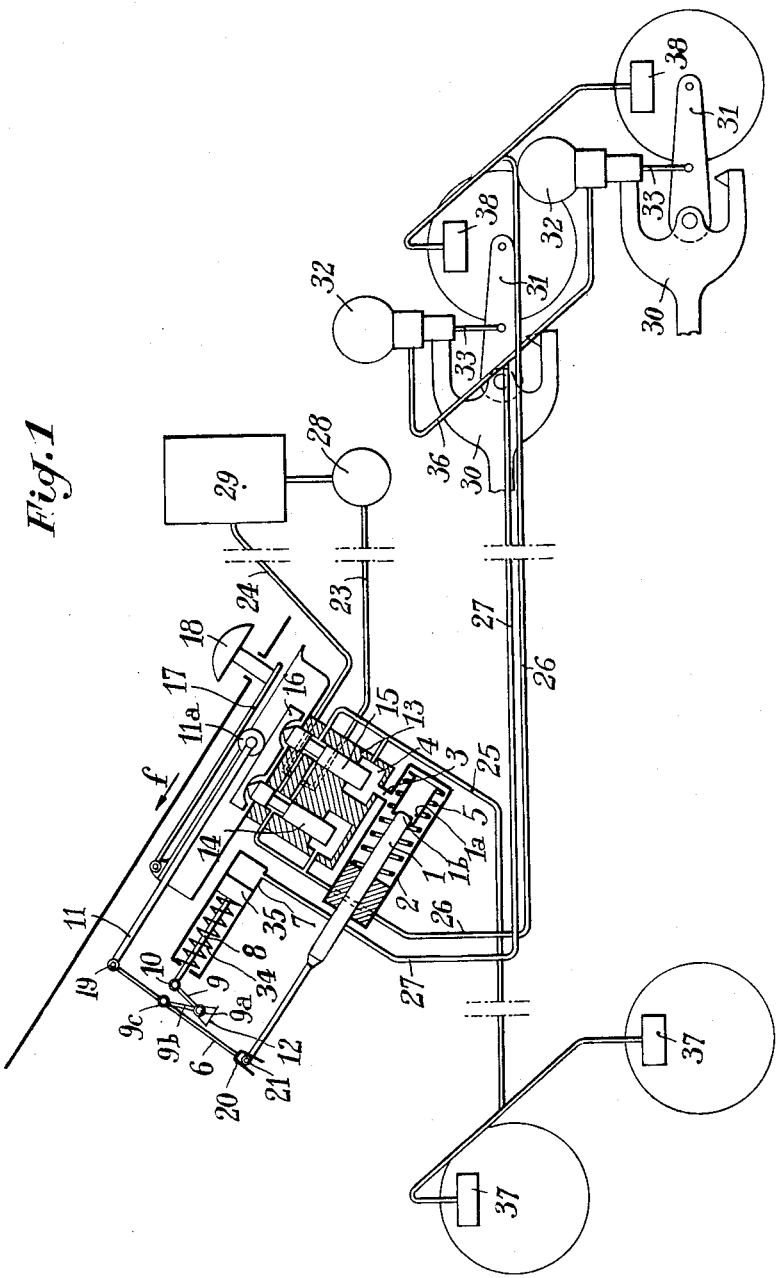
Figure 1 is an assembly diagram of the device on the vehicle.

The device according to the invention comprises members equivalent to those described in the French Certificate of Addition No. 61,598, of April 19, 1951 to the former French patent filed by the applicant, No. 1,014,251 of March 10, 1950, and briefly listed hereafter. A distributor 13 connected through a pair of pipe lines 23 and 24 respectively to the pump 28 and reservoir 29, of a pressure fluid circuit, comprises two slide valves 14, 15 controlling the supply of fluid under pressure to the pair of pipe lines 26 and 25 leading to the rear brakes 38 and front brakes 37 respectively, the pressures of the fluid in the rear and front brake circuit lines being proportional respectively to the pressures exerted on the heads of the slide valves 14, 15. These slide valves 14, 15 are covered by a yoke bar 16 engaged at a point intermediate the axes of these slide valves by a pair of rollers 11a rotatably mounted in a roller carrier 11 adapted to slide longitudinally or in a direction transverse to the common axis of these rollers. Resting on the pair of rollers 11a is a lever 17 carrying on its front end a brake pedal 18 preferably in the form of a press-button or knob. By depressing this brake pedal 18 the driver exerts on the slide valves 14, 15 pressures that are inversely proportional to the distances measured from each slide valve axis to the point of engagement of the rollers 11a with the yoke bar 16, respectively. Therefore, the displacement of the roller carrier 11 which results from the aforesaid sliding control or adjustment action makes it possible to properly proportion the braking force between the front axle and the rear axle of the vehicle.

Figure 3:
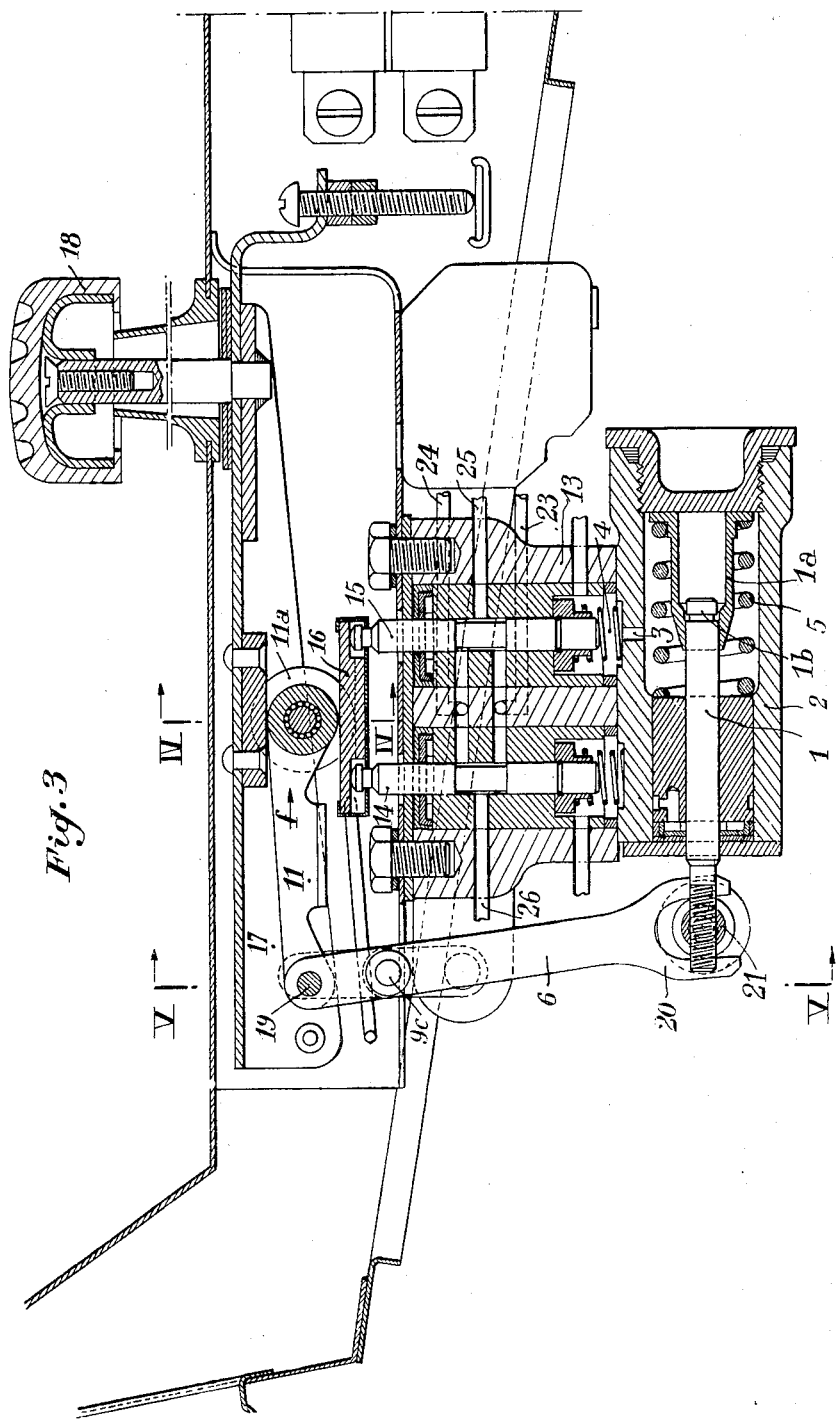
Figure 3 is a section taken upon the line III—III of Fig. 2.

It is already known, as set forth in the aforesaid patent application of the same applicant, to automatically control the roller carrier 11 by means of the outer end of a piston rod responsive to the pressure developing in the hydraulic suspension system of one of the two axles, for example the rear axle. The same arrangement is provided in the embodiment shown and illustrated herein which comprises a cylinder 7 connected through a pipe line 27 to the fluid circuit of the hydraulic suspension system of the rear axle. This suspension system consists as known of a pair of wheel arms 31 pivotally mounted on the frame 30 of the vehicle, each of these arms 31 carrying one of the wheels of the relevant axle, and of a pair of hydropneumatic units 32 solid with the frame 30 and containing two pistons the two rods 33 of which are pivoted on the levers 31 respectively. These two hydropneumatic units 32 are interconnected through a pipe line 36 receiving one end of another pipe line 27. In the cylinder 7 thus connected with the pair of hydropneumatic units 32, a piston 35 is slidably mounted for movement against the resistance of a compressor or return spring 34 the rod 8 of this piston 35 controls the displacement of the roller-carrier 11. To this end, this rod 8 is engaged in a fork 10 formed at one end of a crank 9 mounted on one end of a pin 9a journalled in a fixed bearing 12, the other end of this pin 9a carrying another crank 9b having disposed across its outer end a pin 9c on which an arm or rod 6 is pivotally mounted. The upper end of this arm 6 is pivoted at 19 on the roller carrier 11, whereas its lower end is formed with a forked portion 20 engaging a pin 21 whereby the position of this arm 6 is determined for each position of the pin 9c. Under these conditions, for a given fixed position of the pin 21 the assembly described hereinabove will carry out the function described in the British patent of February 9, 1956, No. 791,071 by the same applicant. As a matter of fact, any increase in the fluid pressure in the hydraulic suspension system of the rear axle and consequently in the two hydropneumatic units 32 is transmitted through the pipe line 27 to the cylinder 7 so as to move the piston 35 and its rod 8, and, at the same time, through the medium of the assembly 9, 9a, 9b, the pin 9c in the direction from slide valve 15 to slide valve 14. Under these conditions it is clear that the first end of the arm 6 which is pivoted on the pin 19 of roller-carrier 11 will move in the same direction as the pin 9c, that is, in the direction of the arrow f while pulling in the same direction the roller-carrier 11 and therefore the rollers 11a themselves towards the slide valve 14, thus increasing the proportion of the braking force which is applied to the rear axle when the head 18 of the brake pedal is depressed. Moreover, according to this invntion, the pin 21 is connected to the outer end of the rod of a plunger 1 slidably mounted in a cylinder 2 and urged by a return spring 5 to the position in which it is shown in Fig. 3 of the drawings, this plunger 1 being controlled by the fluid flowing into this cylinder 2 through the port 3 from the front chamber 4 of distributor 13. As the pressure in this chamber 4 is equal to that of the compressed fluid fed through pipe line 25 to the brakes 37 of the front axle, the plunger 1 will thus push the rollers 11a through the rod 6 pivoted on the pin 9c and roller carrier 11 pivoted on pin 19 towards the slide valve 15 whereby the braking force applied to the front axle is increased.

Figure 2:
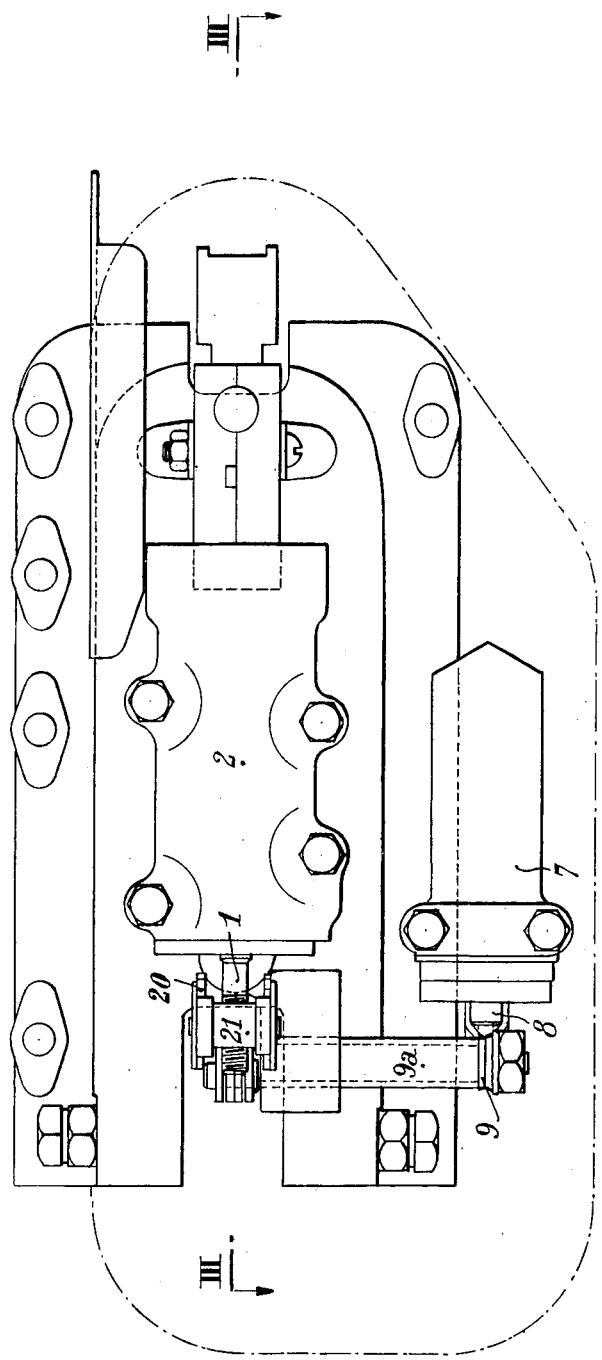
Figure 2 is a view from below this device, from which the pipe lines illustrated in Fig. 1 have been omitted to simplify the drawing.

It will be seen that the form of transmission described hereabove, notably from piston rod 8 to 6, is consistent with the relative arrangement of the two cylinders 2 and 7, as shown notably in Figs. 2 and 5 of the drawings, wherein the cylinder 2 is shown as being mounted beneath the roller-carrier 11 whereas cylinder 7 is shifted both upwards and laterally in relation to said first cylinder 2.

It may be emphasized that as the rear suspension becomes partially unloaded the piston 8 recedes slightly, but this will only alter the correction resulting from the braking pressure, and it is evident that this should preferably be taken into account when selecting the constructional characteristics of the various component elements of the assembly in view of obtaining the desired operation.

Of course, the above-described arrangement constitutes only a typical embodiment of the invention, as many modifications may be brought thereto without departing from the spirit and scope of the invention as set forth in the appended claims.

What I claim is:

1. Braking device for a vehicle having a front axle and a rear axle and a hydropneumatic suspenison system for the rear axle, said suspension system comprising a fluid compressed at a pressure proportional to the load supported by said rear axle, said device comprising two braking mechanisms for the front axle and the rear axle respectively, a circuit for distributing compressed fluid, a distributor fed from said compressed fluid distributing circuit, two pipe lines extending from said distributor to said two braking mechanisms respectively, two valve members carried by said distributor, each valve member when submitted to a control thrust causing the delivery of fluid compressed at a rate proportional to said thrust from said distributor to each one of said pipe lines, respectively, a yoke bar connected to said pair of valve members, a pair of rollers bearing on said yoke bar between said valve members, a brake pedal adapted to apply to said rollers, upon each brake application, a thrust distributed by said yoke bar among said valve members as the inverse ratio of the distances from said pair of rollers to the two valve members respectively, a roller carrier in which said pair of rollers is rotatably mounted, and means acting upon said roller carrier in a manner responsive both to the liquid pressure of the hydropneumatic suspension system of the rear axle and to the pressure of the compressed liquid delivered by said distributor into the pipe line of the hydraulic control of the braking mechanism of said front axle, said means being adapted to move said pair of rollers in the direction of said valve member controlling the rear-axle braking mechanism when the liquid pressure in said rear-axle hydraulic suspension system increases, and to move said pair of rollers in the direction of the valve member controlling the front axle braking mechanism when an increase occurs in the pressure of the compressed liquid delivered by said distributor into the pipe line controlling said front axle braking mechanism.

2. Braking device for a vehicle having a front axle and a rear axle and a hydropneumatic suspension system for the rear axle, said suspension system comprising a fluid compressed at a pressure proportional to the load supported by said rear axle, said device comprising two braking mechanisms for the front axle and the rear axle respectively, a circuit for distributing compressed fluid, a distributor fed from said compressed fluid distributing circuit, two pipe lines extending from said distributor to said two braking mechanisms respectively, two valve members carried by said distributor, each valve member, when submitted to a control thrust causing the delivery of fluid compressed at a rate proportional to said thrust from said distributor to each one of said pipe lines, respectively, a yoke bar connected to said pair of valve members, a pair of rollers bearing on said yoke bar between said valve members, a brake pedal adapted to apply to said rollers, upon each brake application, a thrust distributed by said yoke bar among said valve members as the inverse ratio of the distances from said rollers to said two valve members respectively, a roller carrier on which said pair of rollers is rotatably mounted, a cylinder communicating with the compressed fluid space of the rear axle suspension system, a piston head slidably mounted in said cylinder and urged by the compressed fluid contained therein towards the outer end of said cylinder, a spring urging said piston head in a direction opposite to that in which the fluid pressure is effective in said cylinder, a rod carried by said piston head and having one end projecting from said cylinder, another cylinder communicating with the fluid delivered by said distributor to the pipe line for the hydraulic actuation of said front axle braking mechanism, a plunger slidably mounted in said other cylinder and having one end projecting therefrom, another spring housed in said other cylinder and urging said plunger against the pressure of the fluid contained in said other cylinder, a lever pivoted on said roller carrier, and means for operatively connecting said lever to said piston rod and said plunger respectively, said connecting means setting said lever in a position jointly responsive to the two positions of said piston rod and said plunger, said connecting means displacing on the one hand said roller carrier towards the rear brake control valve when the fluid pressure increases in said rear axle hydropneumatic suspension system, and on the other hand said roller carrier towards said front brake control valve when the pressure increases in the pipe line feeding compressed fluid to the front brake mechanism.

3. Braking device for a vehicle having a front axle and a rear axle and a hydropneumatic suspension system for the rear axle, said suspension system comprising a fluid compressed at a pressure proportional to the load supported by said rear axle, said device comprising two braking mechanisms for the front axle and the rear axle respectively, a circuit for distributing compressed fluid, a distributor fed from said compressed fluid distributing circuit, two pipe lines extending from said distributor to said two braking mechanisms respectively, two valve members carried by said distributor, each valve member, when submitted to a control thrust, causing the delivery of fluid compressed at a rate proportional to said thrust from said distributor to each one of said pipe lines, respectively, a yoke bar connected to said pair of valve members, a pair of rollers bearing on said yoke bar between said valve members, a brake pedal adapted to apply to said rollers, upon each brake application, a thrust distributed by said yoke bar among said valve members as the inverse ratio of the distance from said rollers to said two valve members respectively, a roller carrier on which said pair of rollers is rotatably mounted, a cylinder communicating with the compressed fluid space of the rear axle suspension system, a piston head slidably mounted in said cylinder and urged by the compressed fluid contained therein towards the outer end of said cylinder, a spring urging said piston head in a direction opposite to that in which the fluid pressure is effective in said cylinder, a rod carried by said piston head and having one end projecting from said cylinder, another cylinder communicating with the fluid delivered by said distributor to the pipe line for the hydraulic actuation of said front axle braking mechanism, a plunger slidably mounted in said other cylinder and having one end projecting therefrom, another spring housed in said other cylinder and urging said plunger against the pressure of the fluid contained in said other cylinder, a lever, a fulcrum carried by one end of said lever to constitute a pivotal connection beetween said one end and said roller carrier, a fork carried by the opposite end of said lever, a pin carried by one of the two projecting ends of said piston rod and said plunger, said pin engaging said forked lever end, positive means for operatively connecting said other fulcrum of said lever to the other one of said two projecting ends of said piston rod and said plunger, said two projecting ends of said piston rod and said plunger controlling said roller respectively when they move out from the relevant cylinder, in the direction of movement of said roller respectively towards the valve member controlling said rear axle braking mechanism and towards the valve member controlling the braking mechanism of the front axle.

4. A braking device for vehicle as set forth in claim 3, wherein said means for positively connecting said other lever fulcrum to the other one of said two ends of said piston rod and said plunger comprise a pivotally mounted pin, two radial arms rigidly carried by said pin, one of said radial arms being pivoted on said other lever fulcrum, a fork carried by the other arm, and another pin carried by the other one of said two ends of said piston rod and said plunger, said other pin engaging said fork on said other arm.

References Cited in the file of this patent

FOREIGN PATENTS 1,121,624    France _____ May 7, 1956